(12) United States Patent
Lin et al.

(10) Patent No.: US 8,271,634 B2
(45) Date of Patent: Sep. 18, 2012

(54) BUFFER SYSTEM FOR MANAGING SERVICE MEASUREMENT REQUESTS

(75) Inventors: Sheng Lin, Lisle, IL (US); Suveer Kaul, Banagalore (IN)

(73) Assignee: Alcatel Lucent, Paris (FR)

(*) Notice: Subject to any disclaimer, the term of this patent is extended or adjusted under 35 U.S.C. 154(b) by 369 days.

(21) Appl. No.: 12/453,135

(22) Filed: Apr. 30, 2009

(65) Prior Publication Data

US 2010/0281149 A1 Nov. 4, 2010

(51) Int. Cl.
*G06F 15/16* (2006.01)
(52) U.S. Cl. .................... 709/223; 709/226; 709/232
(58) Field of Classification Search .............. 709/200, 709/223–248; 710/52–57, 310
See application file for complete search history.

(56) References Cited

U.S. PATENT DOCUMENTS

| | | | |
|---|---|---|---|
| 6,424,659 B2* | 7/2002 | Viswanadham et al. | 370/469 |
| 6,570,876 B1* | 5/2003 | Aimoto | 370/389 |
| 7,020,712 B1* | 3/2006 | Chin | 709/234 |
| 7,403,542 B1* | 7/2008 | Thompson | 370/474 |
| 2003/0081625 A1* | 5/2003 | Matsufuru | 370/412 |
| 2006/0020689 A1* | 1/2006 | Roman et al. | 709/220 |
| 2006/0150188 A1* | 7/2006 | Roman et al. | 718/104 |
| 2006/0184657 A1* | 8/2006 | Rezvani et al. | 709/223 |
| 2008/0112420 A1* | 5/2008 | Wang et al. | 370/401 |
| 2008/0291835 A1* | 11/2008 | Cardona et al. | 370/241 |
| 2009/0024550 A1* | 1/2009 | Wynn et al. | 706/46 |
| 2010/0188993 A1* | 7/2010 | Raleigh | 370/252 |
| 2010/0192120 A1* | 7/2010 | Raleigh | 717/101 |

* cited by examiner

*Primary Examiner* — David Lazaro
(74) *Attorney, Agent, or Firm* — Harness, Dickey & Pierce, P.L.C.

(57) ABSTRACT

The present invention relates to a buffer system for managing a plurality of service measurement (SM) requests. In one embodiment, the buffer system includes a count buffer configured to store the SM requests. Each SM request includes a key set and a name-value pair. The name-value pair includes a name field and a value field. The buffer system further includes a send buffer configured to consolidate indices of the count buffer according to a destination address of each of the SM requests and a transport buffer configured to create at least one outgoing message based on data contents of the count buffer than correspond to the indices that have been consolidated.

20 Claims, 4 Drawing Sheets

BUFFER SYSTEM FOR MANAGING SERVICE MEASUREMENT REQUESTS

BACKGROUND

A wireless core network collects service measurement (SM) requests to monitor and manage its network performance. With the ever increasing mobility of wireless users, the collected SM requests are diversely distributed across many network nodes such as an Evolution-Data Optimized or Evolution-Data only (EVDO) network, for example. In the conventional design, the cost of collecting and aggregating SM requests increases as the square of the number of network nodes. This SM growth characteristic prohibits the growth of the network.

Table 1 summarizes an example of the SM growth characteristic according to conventional methods of supporting SM requests.

TABLE 1

| Release | Supported Service Measurement sets | Number of Service Measurement | Memory required (Mb) |
|---------|-----------------------------------|-------------------------------|----------------------|
| R26     | 3,264                             | 95                            | 1.24                 |
| R30     | 9,600                             | 297                           | 11.4                 |
| R32     | 24,000                            | 349                           | 33.5                 |

For example, as the number of SM requests increases, the supported service measurement sets, the number of service measurements, and required memory increases exponentially. Referring to Table 1, the required memory is the memory in Mbyte to temporarily store SM requests. Therefore, as the number of nodes increases, the required memory to store the SM requests increases exponentially. As a result, the cost of implementing a conventional system to collect SM requests may be relatively expensive.

SUMMARY

The present invention relates to a buffer system for managing a plurality of service measurement requests.

In one embodiment, the buffer system includes a count buffer configured to store the SM requests. Each SM request includes a key set and a name-value pair. The name-value pair includes a name field and a value field. The buffer system may further include a send buffer configured to consolidate indices of the count buffer according to a destination address of each of the SM requests and a transport buffer configured to create at least one outgoing message based on data contents of the count buffer that correspond to the indices that have been consolidated. The at least one outgoing message may be further based on overflow data of the send buffer. The transport buffer may be configured to segment each outgoing message.

The buffer system may further include a count buffer hash array configured to receive the SM requests and generate a hash result that identifies a particular count buffer, a linked list of count buffer indices configured to resolve collisions that occur in the count buffer hash array, a send buffer hash array configured to receive the indices of the count buffer and generate a hash result that identifies a particular send buffer, and a linked list of send buffer indices that is configured to resolve collisions that occur in the send buffer hash array. The send buffer hash array and the count buffer array may generate the hash result according to a mod operation.

The count buffer is configured to use an assigned buffer for a given key set and configured to determine whether the name field of the SM request is a new or repeated name based on the name field of the name-value pair and a help array. The help array may include a plurality of indices and a pointer, where each of the indices corresponds to a particular name of the name field. If the pointer of the help array is not initialized, the value field of the SM request was not previously stored in the count buffer. If the pointer is initialized, the value field of the SM request is consolidated with a value of a corresponding buffer with the same name.

In one embodiment, the count buffer is configured to consolidate values of multiple SM requests when the multiple SM requests contain a same key set and name field of the name-value pair. In another embodiment, the name field is allocated 16 bits and the value field is allocated 16 bits. When the value field of the SM request is more than 16 bits, the value field may be dynamically allocated 32 bits.

The send buffer may consolidate indices based on a count buffer indices list according to the destination addresses of the SM requests, where the send buffer is a head of each linked list in the count buffer indices list. The count buffer indices list may be configured to permit the send buffer to copy data contents of the count buffer directly into the transport buffer. The count buffer may remain active until the indices of the count buffer are forwarded.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the present invention, and wherein.

DETAILED DESCRIPTION OF EXAMPLE EMBODIMENTS

Various example embodiments of the present invention will now be described more fully with reference to the accompanying drawings in which some example embodiments of the invention are shown. Like numbers refer to like elements throughout the description of the figures.

As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

The term "node" and/or "network node" may be considered synonymous to and/or referred to as a base transceiver station (BTS), base station, NodeB, an enhanced NodeB, etc. and may describe equipment that provides data and/or voice connectivity between a network and one or more users.

The term "SM request" or "Service Measurement (SM) request" may be considered synonymous to and/or referred to as SM count, which also includes any types of pegging operations.

Embodiments are provided that utilize an efficient and viable store-forward scheme to break the N-square barrier of the conventional art.

To use memory most efficiently, the following principles are adopted. A buffer of fixed size is assigned only when a specific SM request is pegged. All SM counts of the same key set use the same allocated buffer. A repeat pegging of the same count can be aggregated in real time. In case of buffer overflows, buffers are freed by migrating a buffer to the next stage as part of normal operations.

Figure 1:
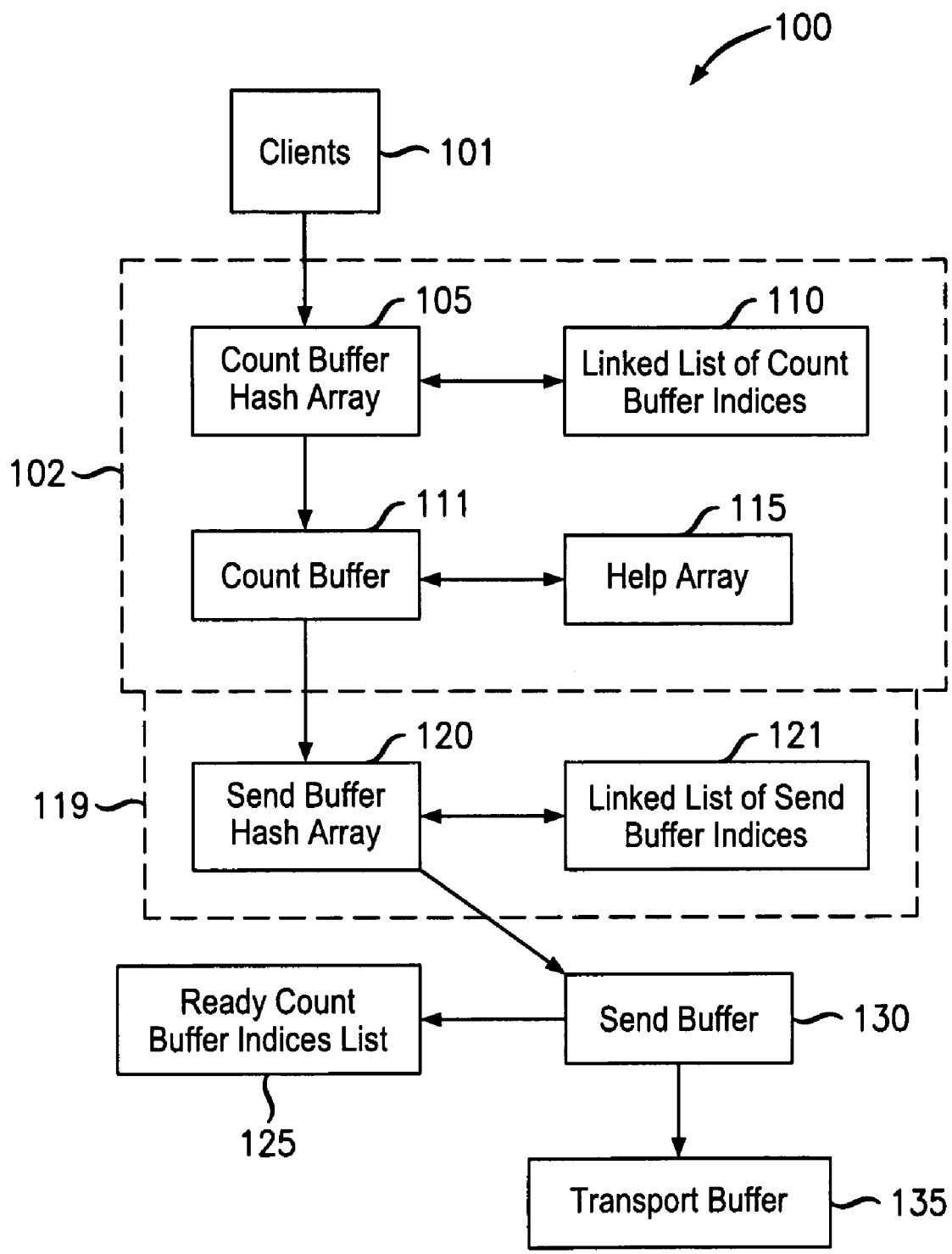
FIG. 1 illustrates a buffer system for managing a plurality of SM requests from clients according to an example embodiment of the present invention.

FIG. 1 illustrates a buffer system 100 for managing a plurality of SM requests from clients 101 and communicating with a name value decoder (not shown) at a remote destination according to an example embodiment of the present invention. The buffer system 100 may include a count buffer system 102, a send buffer manager 119, a ready count buffer indices list 125, send buffer 130, a transport buffer 135. The send buffer manager 119 may include a send buffer hash array 120 and a linked list of send buffer indices 121. The count buffer system 102 may include a count buffer hash array 105, a linked list of count buffer indices 110, a count buffer 111, and help array 115.

The buffer system 100 may be implemented in an Overhead Manager (OHM) and/or Selection Function Main (SFM) which is located at a particular node within a serving system. The OHM may be considered synonymous to and/or referred to as a call handler. The SFM may be considered synonymous to and/or referred to as a data traffic handler. The buffer system 100 may be implemented using hardware, software, or a combination of hardware and software at the OHM and/or SFM. Such existing hardware may include all type of memories and one or more controllers or processors such as digital signal processors (DSPs), application-specific-integrated-circuits, field programmable gate arrays (FPGAs) computers, or the like, for example.

Figure 2:
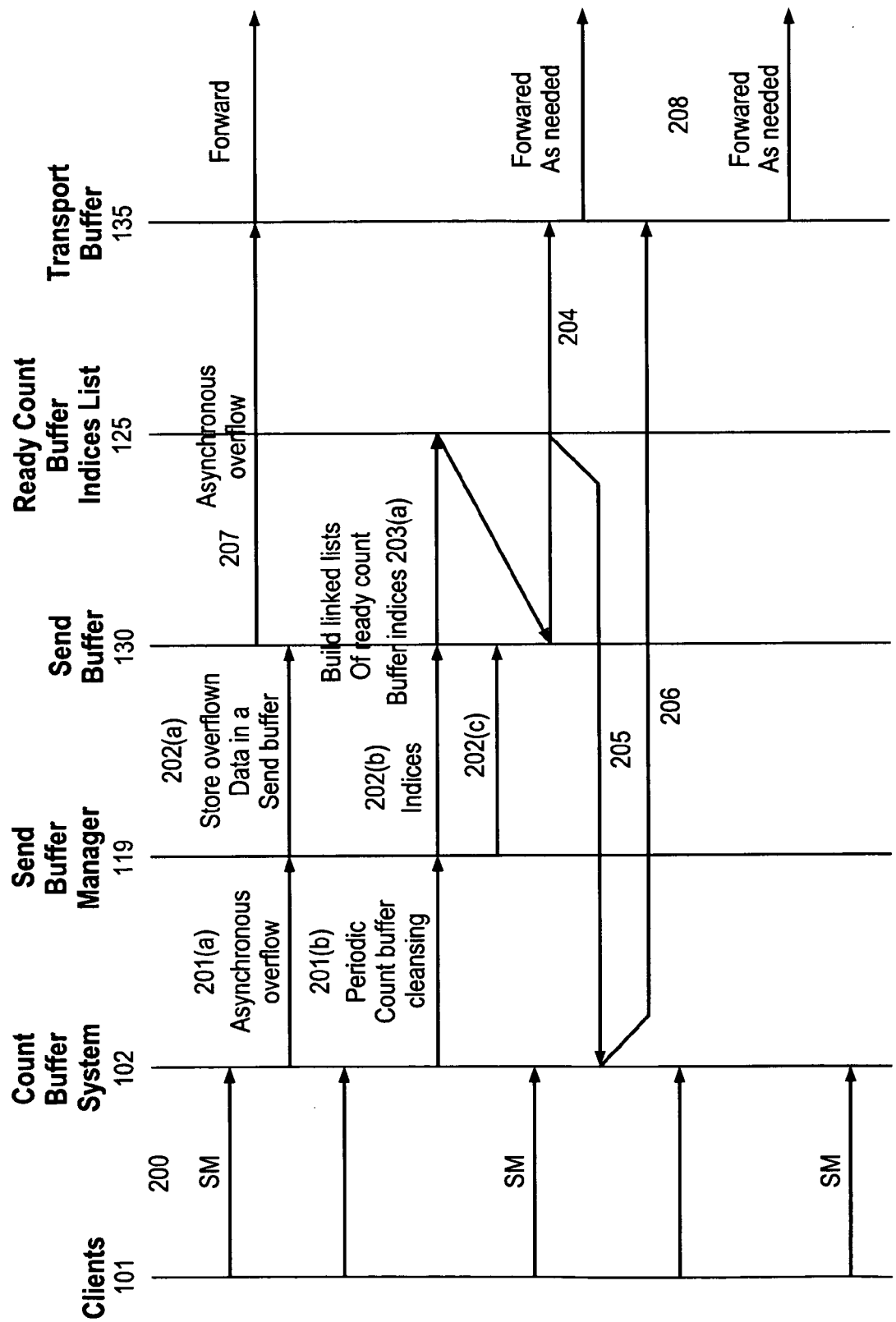
FIG. 2 illustrates an operation of the buffer system according to an example embodiment of the present invention.

FIG. 2 illustrates an operation of the buffer system 100 according to an example embodiment of the present invention.

Referring to FIG. 2, the count buffer system 102 may receive SM requests from the clients 101. Each SM request contains data and is identified by a key set. For instance, each SM request includes a key set and SM data in the form of name-value pairs. The key set of the SM request may include a destination IP address (32 bits), cell (10 bits), channel number (11 bits), sector (3 bits) and band-class (5 bits), which may be coded into 64 bits. The coded 64 bit key set may be referred to as the "coded key." In addition, SM counts may characterized per-sector, per carrier, per cell and per sector-cell or some combination thereof. Table 2 illustrates the characterization of the SM requests, as well as the parameters of the key set.

TABLE 2

|                   | IP Address | Cell Number | Sector Number | Channel Number | Band Class |
|-------------------|------------|-------------|---------------|----------------|------------|
| Per sector-carrier | ✓ | ✓ | ✓ | ✓ | ✓ |
| Per Carrier       | ✓ | NA | NA | ✓ | ✓ |
| Per Cell          | ✓ | ✓ | NA | NA | NA |
| Per sector-cell   | ✓ | ✓ | ✓ | NA | NA |

Each row represents a specific SM set that is keyed and distinguished by the values with a check mark. Nevertheless, keys of all rows can be coded into a 64-bit word. Fixed invalid values may be used for the NA fields.

The count buffer system 102 is configured to manage and store the plurality of SM requests by using the count buffer hash array 105, the linked list of count buffer indices 110, the count buffer 111, and the help array 115 as illustrated in FIG. 1.

The count buffer hash array 105 provides a mechanism for managing the plurality of SM requests to quickly assign a new buffer or retrieve a previously assigned buffer in the count buffer 111.

The term "count buffer" may be considered synonymous to and/or referred to as a first stage buffer. A count buffer stores pegged Service Measurement (SM) counts or requests and is differentiated by a key set. Although the term "count buffer" is used throughout the specification in singular form, it is understood that a count buffer generally may include a plurality of buffers. In other words, a count buffer may include at least one buffer.

The term "send buffer" may be considered synonymous to and/or referred to as a second stage buffer. The send buffer consolidates buffers from the count buffer (e.g., first stage buffers) and is distinguished by different destinations of the SM requests. Although the term "send buffer" is used throughout the specification in singular form, it is understood that a send buffer generally may include a plurality of buffers. In other words, a send buffer may include at least one buffer.

The count buffer hash array 105 is configured to receive SM requests and generate a hash result based on a hashing operation, for example, a mod operation, to identify a particular buffer within the count buffer 111. The count buffer hash array 105 includes the hashing algorithm to convert a large possibility of the key sets to a small set of manageable key sets. According to example embodiments, the count buffer hash array 105 may employ a mod operation, which is a type of hashing algorithm. Although the count buffer hash array 105 described below utilizes a mod operation, the hashing algorithm is not limited to only a mod operation type. The count buffer hash array 105 may include other types of hashing algorithms such as CRC (Circular Redundancy Check), for example.

Generally, the mod operation utilizes the remainder of a division. For instance, the numerator is the key set of the SM request, while the denominator is the manageable number. The manageable number may be referred to as the "base", which is the size of the hash table. Based on the hashing algorithm, the count buffer hash array 105 generates a hash result. The hash result according to the mod operation is illustrated in equation 1.

$$\text{Hash Result} = \text{first coded key} - \text{base} * (\text{first coded key} / \text{base}).  \quad \text{Equation 1}$$

In this formula, the integer truncation of the division is assumed to be inside the parenthesis.

The value of the hash result according to the mod operation is in the range from 0 to base-1 which can be used directly as an index to a hash table array.

In the mod operation, if the key set differs by 1, the hash result will differ by 1. As a result, undesirable crowding may exist, if collisions occur. According to an exemplary embodiment, in order to overcome this problem, the network IP address is moved to the least significant byte and the other three bytes are shifted upwards. Most likely, all IP addresses belonging to the same network will have the same value. Any minor difference in the key sets will be in the more significant positions. Also, by choosing the base to be a prime number, any implicit periodicity is removed.

Referring to FIG. 1, the linked list of count buffer indices 110 operates in conjunction with the count buffer hash array 105 to handle and resolve collisions, which occur in the count buffer hash array 105. Collisions occur as a result of different key sets having the same remainder, i.e. the same hashed result. The details of the linked list of count buffer indices 110 operating in conjunction with the count buffer hash array 105 will be further explained later in the specification with reference to FIG. 4.

The count buffer hash array 105 operating with the linked list of buffer indices 110 generates a buffer index from a new assignment, a buffer index from a previous assignment, and/ or −1 for buffer exhaustion. "−1" is merely used for illustration purposes only. Buffer exhaustion may be indicated by any type of symbol which is different from the symbols used for new and previous assignments. If the generated result is either the buffer index from the new assignment or the buffer index from the previous assignment, the buffer system 100 may utilize the count buffer 111 directly according to the status of the new and/or previous assignment. In regards to a new assignment, the buffer system 100 populates all common fields in an assigned buffer in the count buffer 111.

The count buffer 111 is configured to receive and store the SM requests based on the output of the count buffer hash array 105. As stated above, each SM request includes a key set and a name-value pair. The name-value pair includes a name field and a value field. The details of the count buffer 111 and the help array 115 are described below.

Figure 3:
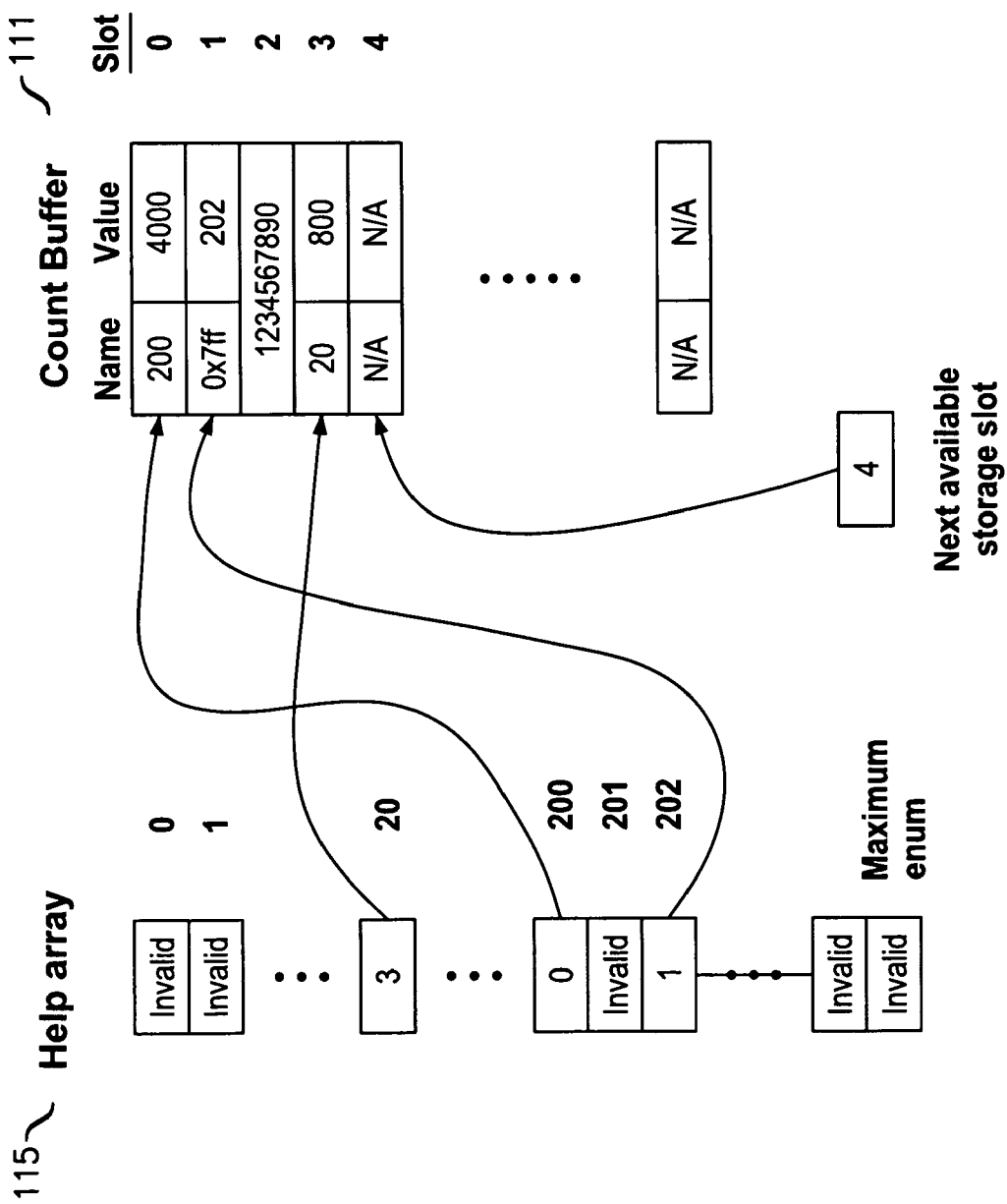
FIG. 3 illustrates a count buffer and help array according to an example embodiment of the present invention.

FIG. 3 illustrates an example embodiment of the count buffer 111 and the help array 115 of FIG. 1. The count buffer 111 includes a name field, a value field, and plurality of slots. Although the plurality of slots includes slots 0-4, example embodiments are not limited to five slots. The number of slots may be much greater than 5 slots.

The name field and the associated value field may be referred to as a name-value pair and the name-value pair may be 32-bits. According to example embodiments, 16 bits may be reserved for the name field, while the remaining 16 bits may be used for the value field. Although the value field of the SM request may be assigned 32 bits, a majority of SM requests do not use the full 32 bits. Therefore, embodiments of the present invention may adapt a 50/50 split of the bits between the name field and the value field. The name field is the enum of the SM request. Enum is a special construct in computer languages, such as the C language, that assigns numbers sequentially to names of SM requests defined by an enum definition. The maximum number of enums is currently around 350, which is the total number of name fields.

On some occasions, the value field of the SM request may require more than 16 bits. In those particular occasions, the value field of the SM request will be allocated 32 bits. The count buffer 111 will be able to switch from SM requests with a value field of less than 16 bits to SM requests with a value field of more than 16 bits in real time. The count buffer 111 may handle any combination of the value field (less than 16 bits, more than 16 bits, and overflowing beyond 16 bits), as well as consolidation operations such as additive, maximum and replacement, which are explained below.

The count buffer 111 is configured to consolidate values of multiple SM requests when the SM requests contain a same key set and name field of the name-value pair. For example, multiple-name value SM pairs belonging to the same set have the same key set. As a result, the multiple name-value SM pairs belonging to the same set share the same buffer within the count buffer 111. Furthermore, the same set of multiple name-value pairs (identified by the same key set) with the same name consolidate their data. The consolidation operations may include addition, maximum, and replacement. Depending on the definition of a SM request, the rule of aggregating SM requests collected at different times dictate special treatment at their consolidation time. For example, if the SM request represents the total number of calls, the total number of calls is added together, i.e. addition. If a SM request is defined as the maximum occupancy, the operation is compared and conditionally replaced, i.e. maximum. If an SM request represents a total number of licenses a particular system has recently granted, the operation may include replacing the previous total number with the current total number, i.e. replacement.

The count buffer 111 is configured to use one unique assigned buffer for a given key set and configured to determine whether the name field of the SM request is a new or repeated name based on the name field of the name-value pair and the help array 115. For instance, after a determination of whether the same set of multiple name-value pairs contain the same name, the count buffer 111 determines whether the name value of the SM request is a new or a repeated name. For repeated names, the count buffer 111 locates the previously stored data for proper consolidation. Instead of searching through the entire list of previously stored SM requests, the count buffer 111 utilizes the help array 115.

The size of the help array 115 is the maximum possible number of the enum for all names of SM requests. Each enum of a SM request is used as an index to the help array 115 to retrieve a pointer to the name-value storage. If the pointer is invalid, a new name and a new slot are assigned. If the pointer is valid, the name is in the storage and the value is to be consolidated. Since in one embodiment the pointer is the enum of a name which is stored as a char and because of the size of a char (i.e., 8 bits), the depth of the count buffer 111 may be limited to 255.

In this particular example of FIG. 3, the name 200 is assigned to slot 0 of the count buffer 111 and its value is 4000. The name 202 is assigned to slot 1. Because the value assigned to slot 1 is 1234567890, which exceeds 16 bits, the value occupies two slots and an indicator of the two-slot storage is provided in the first name-value pair. Name 20 is assigned to slot 3, where the value is 800. Slot 4 is an available slot for a new name of the next SM request.

Referring to FIG. 2 with reference back to FIG. 1, the count buffer system 102 may generate and transmit two types of data to the send buffer manager 119: (1) indices of the count buffer 111 and/or (2) the entire buffer content of the count buffer 111 based on either an asynchronous overflow operation (201(a)) or a periodic count buffer cleansing (201(b)) operation.

The send buffer manager 119 manages the output of the count buffer system 102 by using the send buffer hash array 120 and the linked list of send buffer indices 121. For example, the send buffer hash array 120 and the linked list of send buffer indices 121 operate in a manner similar to the count buffer hash array 105 and the linked list of count buffer indices 110. One difference between the count buffer hash array and the send buffer hash array is that the key set for the send buffer hash array 120 is only 4 bytes. This 4 byte-key set is derived from the IP address of count buffer illustrated above.

The send buffer hash array 120 is configured to receive the indices of the count buffer 111 and generate a hash result based on the mod operation to identify a particular buffer within the send buffer 130. Then, the send buffer hash array 120 is configured to assign a buffer in the send buffer 130 irrespective of the type of data received by the send buffer manager 119. For instance, a buffer within the send buffer 130 is assigned based on the results of a hashing algorithm, which is similar to the operation discussed with reference to the count buffer hash array 105. As indicated above, the send buffer 130 may contain a plurality of buffers, in which one the buffers within the send buffer 130 may be assigned. Similar to the linked list of count buffer indices 110, the linked list of send buffer indices 121 operates in conjunction with the send buffer hash array 120 to handle and resolve collisions that occur in the send buffer hash array 120. The details of the send buffer hash array 120 and the linked list of send buffer indices 121 are explained later in the specification with reference to FIG. 4.

The send buffer 130 either stores the data contents of the count buffer 111 or consolidates indices of the count buffer 111 according to a common destination with the use of the ready count indices list 125 based on a type of buffer operation described below.

Referring to FIG. 2, if the buffer system is performing an asynchronous overflow operation (201(a)), the send buffer manager 119 transmits the data contents of the count buffer directly to the send buffer 130. If the buffer system is performing a periodic count buffer cleansing operation (201(b)), the send buffer manager 119 transmits the indices of the count buffer 111 to the send buffer 130. Operation 201(a) and 201(b) are described below.

For operation 201(a), the data contents of the count buffer 111 are emptied and sent to the send buffer 130 in real time to provide uninterrupted service (201(a) and 202(a)). Then, the data contents are stored in the send buffer 130. The send buffer 130 empties its contents into the transport buffer 135 (207). Operation 201(a) is further described later in the specification with reference to count buffer overflow.

According to operation 201(b), the data contents of the count buffer 111 are not sent to the send buffer 130. Instead, utilizing the indices received from the count buffer, the send buffer 130 consolidates data from the count buffer 111 and directs the consolidated data towards the final destination indicated by the SM request. For example, the count buffer 111 is consolidated based on a common destination. The send buffer 130 will group indices of the count buffer 111 based on the destination IP address and form multiple linked lists of count buffer indices in the ready count buffer indices list 125 (201(b), 202(b) and 203(a)). The assigned send buffer 130 serves the head of the ready count buffer indices list 125 (202(b)). Each buffer in the count buffer 111 is active and holding SM requests until its content is emptied and forwarded to the transport buffer 135.

After completing the ready count buffer indices list 125, marked count and send buffers are cleared in a segmented mode (202(c)). If there is data stored in a send buffer, it will be cleared first (204). After that, the ready count buffer indices list 125 headed by a send buffer allows a controller to copy collected data of the SM requests from the count buffer 111 directly into the transport buffer 135 (205 and 206), thus keeping the memory copy to its minimum.

The transport buffer 135 is configured to create an outgoing message based on the contents of the count buffer 111 (206) as well as the count buffer 111 overflow which is stored in the send buffer 130 (207). As the transport buffer 135 approaches its capacity, the outgoing message is sent from the transport buffer 135 to the remote name-value decoder 140 (not shown). Also, the transport buffer 135 may segment each outgoing message, as further described later in the specification.

Referring to FIGS. 1 and 2, overflow of the count buffer 111, the send buffer 130 and the transport buffer 135 are described below. For instance, two types of count buffer overflow exist: depth overflow and width overflow. Depth overflow occurs when the slots for holding the name-value pairs in a buffer within the count buffer 111 are exhausted. Width overflow occurs when the number of available buffers in the count buffer 111 is exhausted.

To recover from depth overflow, the destination IP address is presented to the send buffer hash array 120. The send buffer hash array 120 locates a buffer for the destination IP address within the send buffer 130. The data contents of that buffer within the count buffer 111 are copied into assigned send buffer 130. Thereafter, the emptied portion of count buffer 111 can be immediately reused.

To recover from width overflow, a buffer within the count buffer 111 is selected based on a simple round robin method. When the buffer is selected, the data contents of the selected buffer may be forwarded to the send buffer 130 in accord with the steps described with respect to handling depth overflow. Additionally however, the newly emptied buffer within the count buffer 111 must be populated with a new key set and new data. Furthermore, the index of the emptied buffer within the count buffer 111 must be removed from the ready count buffer indices list 125, if the index exists, because the newly freed buffer may be used for an SM request destined to a different address.

In one embodiment, the memory in each send buffer 130 is at least the maximum allowable message size for forwarding. If there is a depth overflow in the send buffer 130, its content will be forwarded to the transport buffer 135 for immediately forwarding and new data from the count buffer 111 will be accepted.

In addition, the send buffer 130 is configured to operate on one of its buffer at a time. Each assigned send buffer 130 includes data and includes a ready count buffer indices list 125 that are destined to the common destination. To preserve the data chronological order, the send buffer 130 will empty the contents of the send buffer 130 first before empting contents of the count buffer 111 to the transport buffer 135 because the data contained in the send buffer 130 is always older than the content of count buffer 111.

The transport buffer 135 is configured to transmit outgoing messages that are the maximum allowable size for forwarding to the name value decoder. To efficiently manage the transport buffer 135 overflow, the size of the transport buffer 135 is the sum of the maximum message payload and the maximum size of the count buffer 111. As a result, copying the data contents of the count buffer 111 to transport buffer 135 will be successful. When an overflow occurs in the transport buffer 135, the transport buffer 135 immediately transmits the message, and moves up the freshly copied count buffer 111.

The linked send buffer 130 matches its memory size with the maximum message payload. When the send buffer 130 overflows, the send buffer 130 empties the data contents of the send buffer 130 entirely to the transport buffer 135. The transport buffer 135 will immediately forward the message toward the SM request's destination.

Depending on the size of accumulated SM requests in the count buffer 111, many different types of outgoing messages may be transmitted from the transport buffer 135 to the name-value decoder 140. OHM/SFM may segment the number of messages to be sent from the transport buffer 135 to the name-value decoder 140. An example of segmenting the number of messages to be sent from the transport buffer 135 is pausing after forwarding all SM requests destined to each common destination. During this message sending period, the count buffer 111 stays active until the count buffer 111 receives a new SM request and/or until the count buffer 111 is freed.

To reduce the handshakes between the transport buffer 135 and count buffer 111, the size of the transport buffer 135 is preferably the maximum message size plus the maximum count buffer size. When an overflow occurs, the message up to the last accumulation is sent; where the overflowing part is provided for in a new message. When the send buffer 130 overflows, the send buffer 130 sends the message after copying the overflowing buffer. As a result, the transport buffer 135 is always empty when the transport buffer 135 is not in the middle of collecting the count buffer 111.

Figure 4:
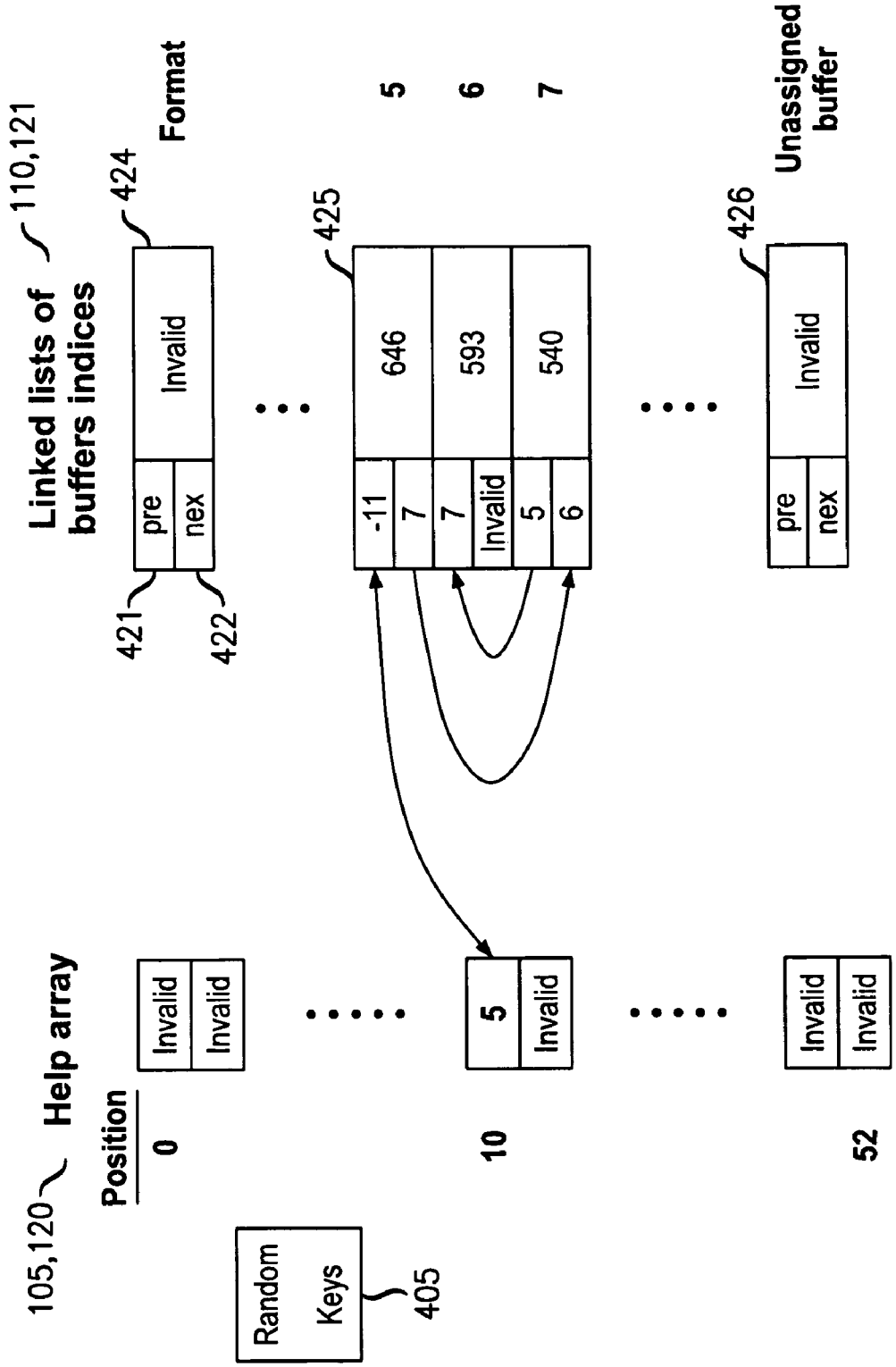
FIG. 4 illustrates a count buffer hash array operating with a linked list of count buffer indices and/or a send buffer hash array operating with a linked list of send buffer indices according to an example embodiment of the present invention.

FIG. 4 illustrates the count buffer hash array 105 operating with the linked list of count buffer indices 110 and/or the send buffer hash array 120 operating with the linked list of send buffer indices 121 according to an example embodiment of the present invention.

The hash array 105, 120 refers to either the count buffer hash array 105 or the send buffer hash array 120, and the linked list of buffer indices 110, 121 refers to either the linked list of count buffer indices 110 or the linked list of send buffer indices 121.

Referring to FIG. 4, the linked list of buffer indices 110, 121 includes a plurality of entries 425. Each of the plurality of entries 425 includes a pre field 421, a next field 422, a key set 424, and an index of its own position (no explicit variable), which are described below.

The next field stores the index of the next buffer and the pre field stores the index of a previous buffer. All buffers in the linked lists of buffer indices 110, 121 include the same hashed value. The next field of a last buffer 426 includes an invalid value. The pre field of the first buffer (425, 1$^{st}$ Buffer) is specially coded to point back to the hash array 105, 120. The index of the plurality of entries 425 maps to the buffer index for managing. In the illustrative example, the hash array 105, 120 has a size of 53 (i.e., 0-52). This particular example also assumes 25 buffers (i.e., indexed by 0-24) are present. The value associated with each slot in the hash array 105, 120 may be 0-25. Because there is not a buffer having the index of 25, the value in the last slot 426 is also invalid, which means no buffer has been assigned to that slot by the hash array 105, 120. All other values are the index of an assigned buffer.

In this particular example, the hash array 105, 120 receives a key set of 593 corresponding to the SM request. The key set of 593 will generate a hash result of 10 according to the mod operation described above. The 10$^{th}$ position of the hash array 105, 120 includes an index of 5, which represents the 5$^{th}$ buffer of the plurality of entries 425. The pre field of the 5$^{th}$ buffer includes −11, which is specially coded to represent the 10$^{th}$ (=−(−11)−1) entry in the hash array 105/120. This field with special coding may be required when the head buffer of a linked list is removed and the association with hash array 105/120 and the linked list of buffer indices 110/121 is maintained.

The key for the 5$^{th}$ buffer is 646. Because the 646 key is not the received key of 593, the operation proceeds to the next field, which indicates the 7$^{th}$ buffer. The key in the 7$^{th}$ buffer is 540. Because the key of 540 does not match the received key of 593, the operation proceeds to the next field, which indicates the 6$^{th}$ buffer. The key of the 6$^{th}$ buffer is 593, which matches the received key of 593. The number 6 is returned as the buffer index that has been previously assigned.

Although the linked list of buffer indices 110, 121 illustrates only one linked list, example embodiments are not limited thereto. The "link" may be as many active lists as the number allows. For example, if all 25 buffers are utilized and no collisions exist, 25 linked lists is the maximum possible number. Each linked list has the size of 1. In order to efficiently manage free buffers, the linked lists of buffer indices 110, 121 may include a list for idle buffers linked properly by the idle buffers' pre and next fields.

A double link list of idle buffers is a special list in the linked list of buffer indices 110, 121. The double link list of free buffers is similar to the linked list of any in-use list as described in FIG. 4 except: 1) the key field has an invalid value such as 0 or −1; 2) head and tail pointers are used to point to the first and last freed buffer; and 3) the pre field of the first buffer includes an invalid value to avoid confusion. When none of the buffers are utilized, all such non-utilized buffers may be maintained in this type of list.

The buffer system of FIG. 1 may be implemented based on a buffer manager template. For instance, the buffer manager template may be implemented by the following function: <class KEY> class buffer_manager>. The buffer manager template may be implemented using the programming language of C++, for example. Implementations may utilize other programming languages. The count buffer 111 and the linked list of count buffer indices 110, and/or the send buffer 130 and the linked list of send buffer indices 121 may be implemented with the same common logic. Differences in the implementation of the count buffer 111 and the linked list of count buffer indices 110 as compared with the send buffer 130 and the linked list of send buffer indices 121 may include the width of the send buffer 130 and the count buffer 111 as well as their key sets. The user may define the number of buffers within the count buffer 111 and the send buffer 130, and the key sets for the count buffer 111 and send buffer 130.

In one embodiment, the buffer manager template <class KEY> class buffer_manager may be instantiated for the send buffer hash array 120 and the linked list of send buffer indices 121 by the following statement: buffer_manager <long> box120$n$121.

The count buffer 111 may be instantiated with a properly defined KEY. In one particular example, the defined KEY may be Buffer_manager <long long> box105$n$110. If keys are not coded into the 64 bit word (e.g., long long), the 64 bit word can be replaced by any user defined data structure. The buffer manager template does not own any buffers for storing application data. However, the buffer manager template manages the buffer indices for usages and may include in one embodiment one or more of the following functions:

A Void init (short_width, short buffer_width) function sets the size of the hash table for the count buffer hash array 105 and/or the send buffer hash array 120, and the range of buffer indices. Also, this function may initialize all linked lists of count buffer indices 110 or linked lists of send buffer indices 121.

An Unsigned short getbufferindex (KEY key, char *new_or_old) function returns the buffer index assigned to the given key, which may be defined by the users. If the buffer index is a new buffer or a previous assigned buffer, the flag new_or_old can differentiate between a new or previous assigned buffer. If a free buffer does not exist, the function may return −1.

A Void release (unsigned short index) function releases the indexed buffer to the idle list.

An Unsigned short getusedbuffer (char *chr_ptr) function returns the number of used buffers and populates a character array provided by the caller. This list may be used by the application to perform periodic count buffer cleansing, whereas only used buffers need cleansing.

An unsigned short get_max_collision( ) function returns the maximum hash collision since last call.

The ready count buffer indices list 125 of FIG. 1 may be implemented using one or more of the following functions:

A Void init (short send_width, short count_width) function acquires memory for managing with the send buffer 130 and the count buffer 111.

A Void insert (short send_index, short count_index) function inserts a count buffer index into the list anchored by the send buffer of index send_index.

A Void remove (short count_index) function removes the count buffer index from the list as a result of count buffer width, but not depth overflow. That indexed count buffer is immediately assigned for other usage.

A Short get_next (short send_index) function frees the next count buffer index from the list anchored on this send buffer and returns the count buffer index. If there is no count buffer on the list, the function may return −1.

The above-described buffer_manager template may be used in many applications. Although devices are limited in the number of buffers with many different types of service requests, the buffer_manager template can be used to efficiently manage all available buffers for usages and provide overflow indication.

With properly engineered count buffers (e.g., their width and depth) and proper handling of overflows, the ensemble of count and send buffers described in this invention can provide virtually unlimited buffers for any application with good performance characteristics. Hence, the provided embodiments can accommodate the ever growing mobility network.

What is claimed is:

1. A buffer system for managing a plurality of service measurement (SM) requests, the buffer system comprising:
at least one processor configured to control a plurality of buffer elements, the plurality of buffer elements including,
a count buffer configured to store the SM requests and generate indices of the SM requests located in the count buffer, each SM request including a name-value pair, the name-value pair including a name field and a value field; and
a send buffer configured to consolidate the indices of the count buffer according to a destination address of each of the SM requests; and
a transport buffer configured to receive data contents of the SM requests from locations of the count buffer that correspond to the consolidated indices, and create at least one outgoing message, the at least one outgoing message including the received data contents.

2. The buffer system of claim 1, wherein the at least one outgoing message is further based on overflow data of the send buffer.

3. The buffer system of claim 1, wherein the transport buffer is configured to segment each outgoing message.

4. The buffer system of claim 1, wherein the plurality of buffer elements further includes:

a count buffer hash array configured to receive the SM requests and generate a hash result that identifies a particular count buffer;
a linked list of count buffer indices configured to resolve collisions that occur in the count buffer hash array;
a send buffer hash array configured to receive the indices of the count buffer and generate a hash result that identifies a particular send buffer; and
a linked list of send buffer indices is configured to resolve collisions that occur in the send buffer hash array.

5. The buffer system of claim 1, wherein, before storing a current SM request, the count buffer is configured to determine whether the name field of the current SM request is a new or repeated name without searching an entire list of stored SM requests in the count buffer based on a help array, the help array including a plurality of indices and a pointer, each of the indices corresponding to a particular name of possible names for the name field.

6. The buffer system of claim 1, wherein the count buffer is configured to consolidate values of multiple SM requests when the multiple SM requests contain a same name field of the name-value pair.

7. The buffer system of claim 1, wherein the send buffer consolidates the indices based on a count buffer indices list according to the destination addresses of the SM requests, the send buffer being a head of each linked list in the count buffer indices list.

8. The buffer system of claim 7, wherein the count buffer indices list is configured to permit the at least one processor to copy the data contents of the count buffer corresponding to the locations of the consolidated indices directly into the transport buffer.

9. A buffer system for managing a plurality of service measurement (SM) requests, the buffer system comprising:
at least one processor configured to control a plurality of buffer elements, the plurality of buffer elements including,
a count buffer configured to store the SM requests, each SM request including a name-value pair, the name-value pair including a name field and a value field;
a send buffer configured to consolidate indices of the SM requests located in the count buffer according to a destination address of each of the SM requests and to send the SM requests to a transport buffer.

10. The buffer system of claim 9, wherein the count buffer is configured to consolidate values of multiple SM requests if the multiple SM requests contain a same name field of the name-value pair.

11. The buffer system of claim 9, wherein, before storing a current SM request, the count buffer is configured to determine whether the name field of the current SM request is a new or repeated name without searching an entire list of the stored SM requests in the count buffer based on a help array, the help array including a plurality of indices and a pointer, each of the indices corresponding to a particular name of possible names for the name field.

12. The buffer system of claim 11, wherein if the pointer of the help array is not initialized, the value field of the current SM request was not previously stored in the count buffer.

13. The buffer system of claim 11, wherein if the pointer is initialized, the value field of the SM request is consolidated with a value of a corresponding buffer with the same name.

14. The buffer system of claim 9, wherein the name field is allocated 16 bits and the value field is allocated 16 bits.

15. The buffer system of claim 14, wherein when the value field of the SM request is more than 16 bits, the value field is dynamically allocated 32 bits.

16. A buffer system for managing a plurality of service measurement (SM) requests, the buffer system comprising:
at least one processor configured to control a plurality of buffer elements, the plurality of buffer elements including,
a count buffer configured to store the SM requests and generate indices of the SM requests located in the count buffer,
a send buffer configured to consolidate the indices of the count buffer according to a destination address of each of the SM requests, each SM request including a name-value pair, the name-value pair including a name field and a value field, the send buffer configured to store overflow data of the count buffer and to send the SM requests to a transport buffer.

17. The buffer system of claim 16, wherein the send buffer consolidates indices of the count buffer based on a count buffer indices list according to the destination addresses of the SM requests, the send buffer being a head of each linked list in the buffer indices list.

18. The buffer system of claim 16, wherein at least one processor is configured to send data contents of the count buffer that corresponds to the indices that have been consolidated.

19. The buffer system of claim 16, wherein the at least one outgoing message is further based on overflow data of the send buffer.

20. The buffer system of claim 19, wherein the at least one processor sends the overflow data of the send buffer before sending the data contents of the count buffer.

* * * * *